United States Patent
Schick

[15] 3,704,932
[45] Dec. 5, 1972

[54] STEREOMICROSCOPE
[72] Inventor: Dieter Schick, Giessen, Germany
[73] Assignee: Ernst Leitz GmbH
[22] Filed: Nov. 22, 1971
[21] Appl. No.: 200,676

[30] Foreign Application Priority Data

Nov. 28, 1970 Germany...................P 20 58 675.8

[52] U.S. Cl. ......................350/35, 350/27, 350/36, 350/48, 350/50, 350/137, 350/138
[51] Int. Cl........................G02b 21/22, G02b 23/04
[58] Field of Search........350/27, 35, 36, 48, 50, 138, 350/137

[56] References Cited

UNITED STATES PATENTS 1,862,031  6/1932  Patterson ..............................350/35

FOREIGN PATENTS OR APPLICATIONS 719,076  10/1965  Canada ..................................350/35

Primary Examiner—David Schonberg
Assistant Examiner—Paul A. Sacher
Attorney—Kraft & Wells

[57] ABSTRACT

In a stereomicroscope with two parallel image-forming bundles of light beams and oblique image viewing a Schmidt prism is so arranged that either bundle of light beams impinges completely on only one respective roof surface of the Schmidt prism. Two sets of reflectors in Rhombus arrangement are provided behind the Schmidt prism in the direction of light travel so as to deflect a respective one of the beams emerging from the prism to the eyepieces. The arrangement allows a distortion-free adjustment of the eye distance; and in the manufacture of the component parts of the system less accuracy may be observed compared with prior art systems.

3 Claims, 4 Drawing Figures

STEREOMICROSCOPE

BACKGROUND OF THE INVENTION

The present invention relates to an image deflection system for stereomicroscopes such as those with oblique image viewing.

Stereomicroscopes may have two objectives, or only a single primary objective with a following optical system which generates two separate image-forming beams which are each passed, independently through appropriate deflection systems, to an eyepiece. In the deflection of the image-forming beams image reversal may be provided, the optical axis may be inclined for oblique viewing, and also the possibility may be provided of eye spacing adjustment in the eyepiece tubes.

Customary systems which perform these functions are Schmidt prisms and Porro prisms. In the case of Schmidt prisms, if the roof edge is used to form the image, then a very high degree of precision is demanded in the fabrication of the roof edge and of the angle between the roof surfaces. But if only the roof surfaces are used, then each roof surface must accommodate the total beam cross section, and difficulties arise during the passage of the rays, due to vignetting. Porro prisms are again not suitable in every case, because they may have to be very large, depending upon the beam cross section, and they also necessitate considerable adjustment and assembly work. Because the known systems are firmly attached to the associated eyepiece tube and participate in rotation of the tube during eye distance adjustment, this produces distortion which leads to a deterioration of the stereo image and a considerable burden on the eyes of the observer.

It is therefore an object of the invention to provide an image deflection system for stereomicroscopes which generates a complete reversal of the image produced by the objective.

It is another object to provide an image deflection system which allows for an eye distance adjustment without any image deterioration. It is a further object to provide an image deflection system which, with appropriately chosen lens systems and prism systems, allows the employment of light ray bundles in front of the deflection system having the greatest possible cross section.

And it is still another object to provide a deflection system of which the component elements may be manufactured with greater tolerances than the elements of the known systems.

SUMMARY OF THE INVENTION

According to the present invention, there is provided an image deflection system for deflecting an image produced by a stereomicroscope, comprising optical maens to produce two image-forming beams derived from an object, a Schmidt prism so located in the paths of both of the image-forming beams produced by the optical means that each of the beams impinges on only a respective one of the two roof surfaces of the prism, and two sets of reflectors in Rhombus arrangement, each set being arranged to deflect a respective one of the beams emerging from the prism to an observation arrangement. Rhombus arrangement in this connection means that the reflecting surfaces of one respective set of reflectors are substantially parallel to one another and facing each other.

In one construction the two sets of reflectors are so arranged that the beams mutually cross.

The system may comprise in each set of reflectors at least one reflector mounted to be pivotable about the axis of the beam impinging thereon.

The system may comprise adjustment means to permit adjustment of the spacing of corresponding reflectors of the respective sets. The last feature is particularly useful if the eye distance adjustment is required to occur by lateral displacement of the eyepiece tubes.

BRIEF DESCRIPTION OF THE DRAWINGS

An embodiment of the invention will now be more particularly described, with reference to the accompanying drawing, in which.

DESCRIPTION OF THE PREFERRED EMBODIMENT

Figure 1:
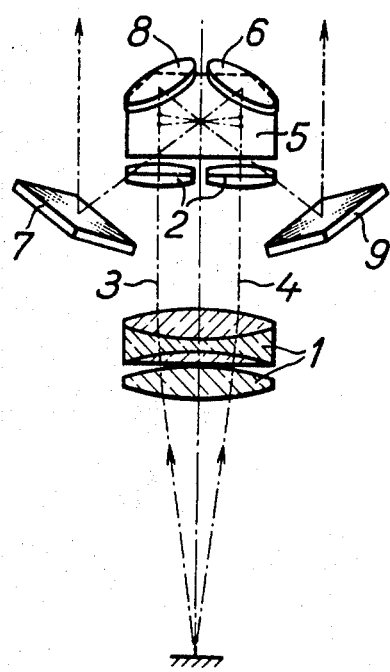
FIG. 1 shows schematically the ray path in a stereomicroscope, through the objective part and the deflecting system.
Figure 3:
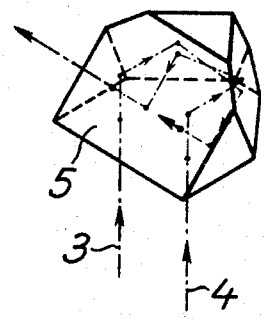
FIG. 3 shows schematically in perspective view the ray path through the Schmidt prism used.
Figure 2:
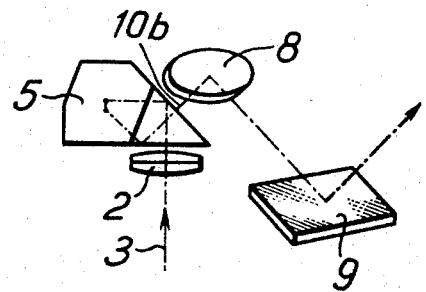
FIG. 2 shows schematically in side elevation the ray path through the deflecting system.
Figure 4:
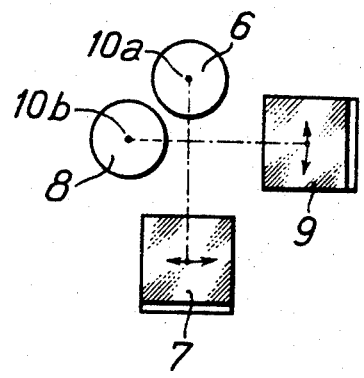
FIG. 4 shows schematically the movement of the sets of reflectors which is provided for the eye spacing adjustment.

Central rays 3 and 4 formed by a common lens system 1 and by following optical systems 2 are passed into a common Schmidt prism 5 in such a way that the left-hand ray path 3 is deflected to the right, and the right-hand ray path 4 to the left. At the same time the image is totally reversed in each case.

In order to bring each respective beam, which is now on the wrong side, on to the correct side, a pair of reflectors in the form of mirrors arranged as a Rhombus prism is fitted in each case so that the beam is deflected diagonally on to the required side.

A mirror 6 deflects the eventual left-hand beam having the central ray 4, which leaves the upper part of the prism 5 on the right-hand side, back diagonally to the left on to the mirror 7. From there the beam is directed into the left-hand eyepiece tube (not shown). A corresponding procedure is followed with the eventual right-hand beam, via the mirrors 8 and 9.

The use of a common Schmidt prism 5 for both the beam paths of the stereomicroscope constitutes a particularly economic utilization of this component, since in this arrangement both of the halves of the prism symmetrical about the roof edge serve both to accommodate the one beam and also transmit the other beam. This compact construction permits large reflecting surfaces, so that vignetting may be kept small. Since the roof edge does not appear in the image, no production difficulties arise therefrom. Wide tolerances are, however, made possible for the roof angle, because additional possibilities of adjustment are created by the arrangement of mirrors 6, 7, 8, 9.

For the eye spacing adjustment, the two reflecting systems 6, 7 and 8, 9 are rotated about the axis 10a or 10b of the beam entering the respective set of mirrors. Since the pairs of mirrors 6, 7 and 8, 9 correspond to a Rhombus prism in each case, no somersaulting of the images occurs due to the rotation.

In other cases than the embodiment illustrated, lateral exchange of the image-forming beams occurs upon entry into the Schmidt prism. In this case the reflecting systems 6, 7 and 8, 9 should be arranged so that the image-forming ray paths do not mutually cross.

The illustrated image deflecting system for stereomicroscopes is simple to adjust, achieves a total deflection of the image cast by the objective, and at the same time makes possible substantially distortion-free eye-separation adjustment without somersaulting or inversion of the images, permits beams of the largest cross-sections to be used, with appropriately chosen lens and prism systems in front of the deflecting system, and has components which can be fabricated to wider tolerances than the components of known systems.

What I claim is:

1. An image deflection system for deflecting an image produced by a stereomicroscope, comprising:
   a. optical means to produce two image-forming beams derived from an object;
   b. a Schmidt prism so located in the paths of both of the image-forming beams produced by the optical means that each of the beams impinges on only a respective one of the two roof surfaces of the prism; and
   c. two sets of reflectors in Rhombus arrangement, each set being arranged to deflect a respective one of the beams emerging from the prism to an observation arrangement.

2. A system as claimed in claim 1, wherein the two sets of reflectors are so arranged that the beams mutually cross.

3. A system as claimed in claim 1, wherein each set of reflectors comprises at least one reflector mounted to be pivotable about the axis of the beam impinging thereon.

* * * * *